United States Patent [19]

Koide et al.

[11] 4,186,991
[45] Feb. 5, 1980

[54] ANGULARLY ROTATABLE MIRROR APPARATUS

[75] Inventors: Hiroshi Koide, Sagamihara; Junichi Watanabe, Kawasaki; Shigemoto Tenmyo, Tokyo, all of Japan

[73] Assignee: Ricoh Co., Ltd., Japan

[21] Appl. No.: 919,630

[22] Filed: Jun. 27, 1978

[30] Foreign Application Priority Data

Jun. 30, 1977 [JP] Japan ............................... 52-78261

[51] Int. Cl.$^2$ ............................................. G02B 23/00
[52] U.S. Cl. ................................... 350/6.91; 350/285; 358/199
[58] Field of Search ..................... 350/6.91, 285, 6.9; 355/8, 66; 358/7.6, 295, 199; 310/12; 250/235; 354/11, 12.5

[56] References Cited
U.S. PATENT DOCUMENTS

| 4,011,003 | 3/1977 | Dragt | 350/6.91 |
| 4,021,096 | 5/1977 | Dragt | 350/6.91 |
| 4,054,359 | 10/1977 | Shogren et al. | 350/6.91 |

*Primary Examiner*—F. L. Evans
*Assistant Examiner*—B. W. de los Reys
*Attorney, Agent, or Firm*—McGlew and Tuttle

[57] ABSTRACT

An angularly rotatable mirror apparatus including angularly rotatable mirror means and linear motor means. The angularly rotatable mirror means includes a mirror supported on a bracket and connected through an arm to the linear motor means for angularly rotating the mirror including a magnetic circuit consisting of a permanent magnet, a center pole an outer yoke, and a gap defined between the center pole and the outer yoke, and a movable coil arranged in the gap and connected to the arm. Means is provided for effecting control of the operation of the linear motor means in such a manner that a light flux reflected by the mirror will move at a constant speed on a surface to be scanned by the light flux.

6 Claims, 9 Drawing Figures

ANGULARLY ROTATABLE MIRROR APPARATUS

BACKGROUND OF THE INVENTION

This invention relates to an angularly rotatable mirror apparatus adapted for use with a device for effecting slit exposing of a photosensitive member to an optical image of an original to be copied by a copying machine.

In one type of angularly rotatable mirror apparatus known in the art of electronic copying, an angularly rotatable mirror is adapted to reflect light, which emanates from a light source of an original exposing device, toward an original placed on an original supporting glass plate so as to scan the surface of the original by the reflected light at a constant speed while the mirror is angularly rotated. In this type of angularly rotatable mirror apparatus, it is necessary that the light reflected by the angularly rotated mirror scan the surface of the original at a constant speed so as to expose a photosensitive member of a copying machine to an accurate optical image of the original. To attain this end, the angular velocity of the angularly rotated mirror should be varied in accordance with a change in the position of the original which is scanned by the reflected light. Stated differently, the mirror should not be angularly rotated at a constant angular velocity.

Figure 1:
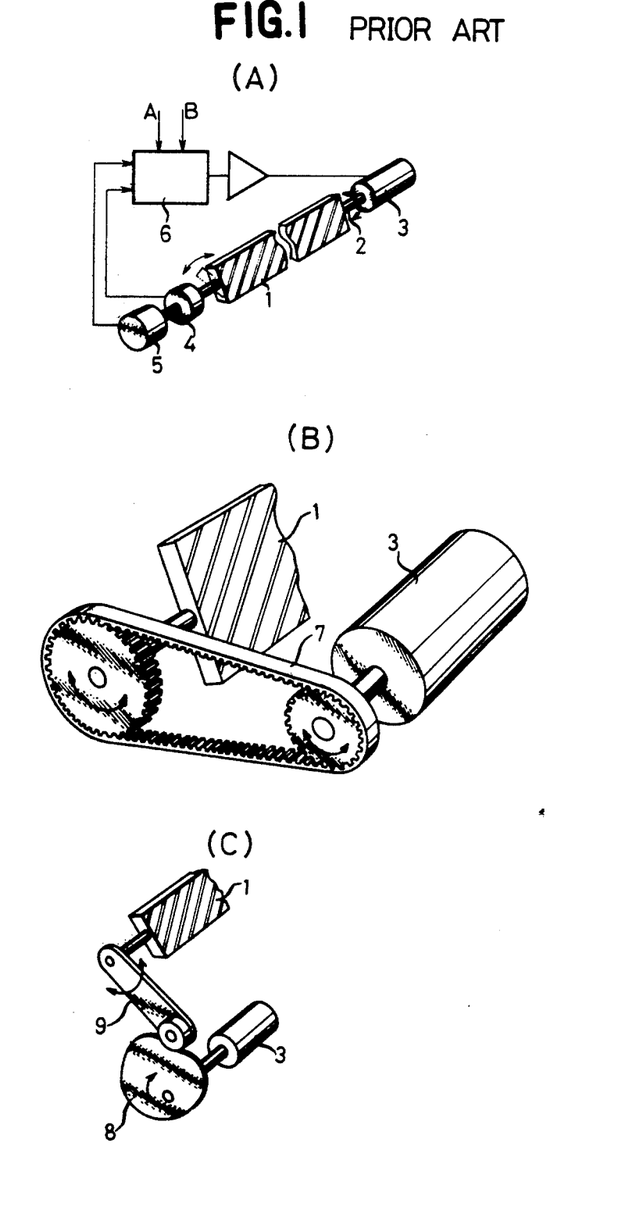
FIGS. 1(a), 1(b) and 1(c) are schematic views of mechanisms for driving an angularly rotatable mirror of the prior art.

In one known mechanism for driving an angularly rotatable mirror to cause the same to angularly rotate at angular velocities which vary so as to meet the aforesaid requirement, a servomotor 3 is directly connected to a rotary shaft 2 for supporting the mirror 1 which shaft supports thereon an angle detector 4 and an angular velocity detector 5, as shown in FIG. 1(a). Detection signals supplied by the two detectors 4 and 5, as well as a required angle signal A and a required angular velocity signal B, are fed to a control circuit 6 which controls the servomotor 3. If the motor is an AC motor, this mechanism is not suitable for controlling a miniscule angle, because the number of poles is finite and the phase control of the voltage of a control winding is a complicated process.

Figures 2, 3:
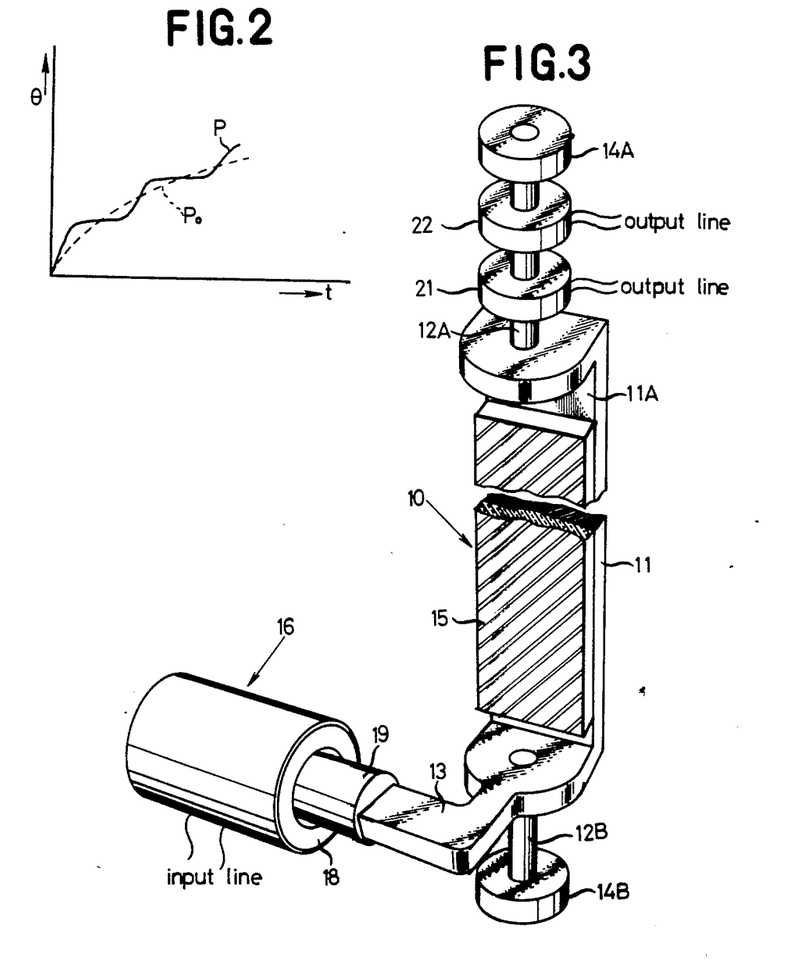
FIG. 2 is a diagram in explanation of drift which occurs when an angularly rotatable mirror is driven by an angularly rotatable mirror driving mechanism of the prior art.
FIG. 3 is a schematic perspective view, as seen obliquely from above, of the angularly rotatable mirror apparatus comprising one embodiment of the present invention.

As shown in FIG. 2, an actual path P of angular movement of the mirror 1 as plotted in a diagram of rectangular coordinates in which the abscissa indicates the time and the ordinate represents the angle of rotation tends to deviate from a required path $P_0$ and show drift. In case the motor is a DC motor, the number of poles of the motor stator affects the actual path of angular movement of the mirror 1 and gives rise to a cocking phenomenon, with the result that the actual path also deviates from the required path, showing drift.

FIG. 1(b) shows another mechanism for driving the mirror 1 to cause the same to angularly rotate, in which the driving force of the servomotor 3 is directly transmitted to the mirror 1 through a belt 7 or a gear, not shown. In this mechanism, deviation of the actual path from the required path or drift, which is caused by the number of poles of the motor stator, is minimized. However, wobbling of the belt 7 or gear (due to backlash, mechanical vibration, etc.) tends to cause deviation of the angular movement from the required path.

A still another mechanism shown in FIG. 1(c) is known in which a constant function is given to the angular rotation of the mirror 1 by using a cam 8 and a link 9. In this mechanism, difficulties are encountered in eliminating influences which are exerted on the angular rotation of the mirror by the wobbling of the cam, the degree of precision with which the cam is finished, and the presence of dust on the surface of the cam.

SUMMARY OF THE INVENTION

This invention has as its object the provision of an angularly rotatable mirror apparatus which enables an angularly rotatable mirror to smoothly rotate angularly through a predetermined range of angles at angles of rotation and rotational angular velocities which are in conformity with a required function.

According to the invention, there is provided an angularly rotatable mirror apparatus comprising angularly rotatable mirror means comprising a bracket including a rectangular planar portion having a plurality of upstanding walls located at opposite ends of the longitudinal axis of the rectangular planar member, a plurality of rotary shafts each rigidly secured to one of the upstanding walls and supported by a bearing for rotation, and a plane mirror supported on an upper surface of the rectangular planar portion of the bracket; arm means extending from one of the upstanding walls of the bracket at right angles to the rotary shafts; linear motor means for driving the angularly rotatable mirror means comprising a permanent magnet having two poles, a center pole circular in cross sectional shape and extending linearly from one of the poles of the permanent magnet, an outer yoke of a cylindrical shape in contact with the other pole of the permanent magnet and enclosing the center pole a gap defined between the center pole and the outer yoke, and a movable means having a cylindrical coil located in the gap and reciprocatorily movable in a direction in which the center pole extends; and means for securedly connecting the movable means of the linear motor means to the arms means.

DESCRIPTION OF THE PREFERRED EMBODIMENTS

Preferred embodiments of the present invention will now be described by referring to the accompanying drawings.

FIG. 3 shows one embodiment of the angularly rotatable mirror apparatus in conformity with the invention which is associated with the slit exposing device of a copying machine. In FIG. 3, the numeral 10 generally designates angularly rotatable mirror means which is located beneath the vicinity of one end of an original supporting glass plate of a copying machine, not shown. The angularly rotatable mirror means 10 comprises a bracket 11 including a rectangular planar portion 11A having upstanding walls at opposite ends of the longitudinal axis thereof, a plurality of rotary shafts 12A and 12B each rigidly secured to one of the opposite upstanding walls of the bracket 11, and a plane mirror 15 supported on the surface of the rectangular planar portion 11A of the bracket 11. The plurality of rotary shafts 12A and 12B are rotatably supported by bearings 14A and 14B respectively in such a manner that the axis of rotation of the rotary shafts 12A and 12B are substantially parallel to the original supporting glass plate. The plane mirror 15 is disposed on the surface of the rectangular planar portion 11A in such a manner that the axis of rotation of the angularly rotatable means 10 is in alignment with the longitudinal axis of the mirror 15 and is located at the same plane as the surface of the mirror 15 which reflects light. A light flux from a light source is directed to the axis of rotation of the mirror means 10. That is, if the mirror 15 is arranged as aforesaid, the position on the mirror 15 in which the center line of the optical axis of the light flux is reflected will be in alignment with the axis of rotation of the mirror means 10 without being affected by the rotational movement of the mirror 15. Thus the operation function of the angularly rotatable mirror means 10 can be readily obtained from the surface of the original to be scanned and the position of the axis of rotation of the mirror means 10.

An arm 13 extends from one of the upstanding walls of the bracket 11 at right angles to the rotary shaft 12B, and is connected at its forward end to a movable means 19 of a linear motor 16 of the moving coil type.

Figure 4:
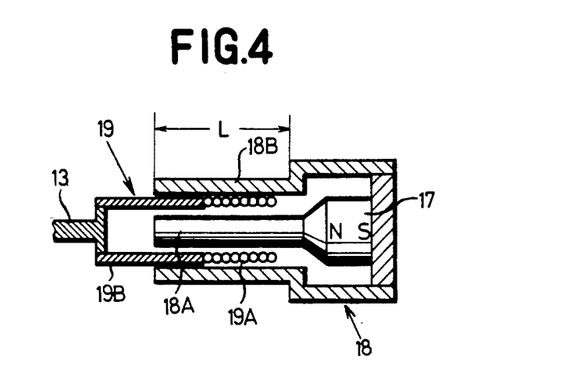
FIG. 4 is a sectional view of the moving coil type linear motor means of the apparatus shown in FIG. 3, shown as being connected to the arm means extending from the angularly rotatable mirror means.

Referring to FIG. 4, the linear motor 16 comprises a permanent magnet 17, a yoke means 18 and the movable means 19. As shown, the yoke means 18 consists of a center pole 18A linearly extending from one end (a north pole) of the permanent magnet 17, and an outer yoke 18B of the cylindrical shape in contact with the other end (a south pole) of the permanent magnet 17 and extending parallel to the center pole 18A in a manner to enclose the same. The yoke means 18 and the permanent magnet 17 constitute a magnetic circuit, and the center pole 18A and the outer yoke 18B define therebetween a gap of the magnetic circuit. The movable means 19 consists of a coil 19A located in the gap and surrounding the center pole 18B for linear reciprocatory movement, and a cylindrical portion 19B fixedly secured to one end thereof to the coil 19A. The movable means 19 of the linear motor 16 is secured connected at the other end thereof to the arm 13 extending from the angularly rotatable mirror means 10, by a suitable means, such as tightly fitting one into the other and bonding one to the other by means of a bonding agent.

Referring to FIG. 3 again, an angle detector means 21 and an angular velocity detector means 22 are mounted to the rotary shaft 12A of the angularly rotatable mirror means.

The principle of operation of the moving coil type linear motor 16 or of the axial displacement of the movable means 19 is known. The operation of the linear motor will be described by referring to the embodiment shown in FIG. 4. The axial displacement of the movable means 19 is proportional to an input within a range L. Therefore, if the linear motor 16 is constructed as shown in FIG. 4, the mirror 15 will accurately respond, showing no drift, to an input applied to the linear motor 16 and will rotate angularly as desired.

Figure 5:
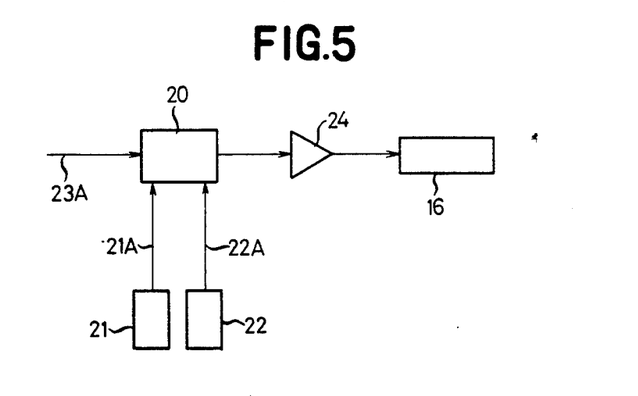
FIG. 5 is a block diagram of the linear motor control means.
Figure 6:
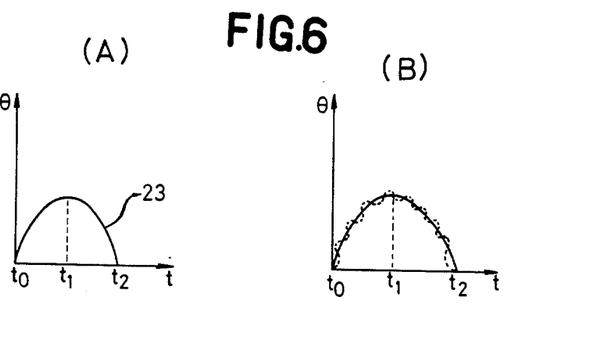
FIG. 6(a) is a graph showing a required angular position function.
FIG. 6(b) is a graph showing an example of the actual path of angular rotation of the mirror, in comparison with the path of angular movement of a mirror driven by a driving device of the prior art, which is obtained when the function shown in FIG. 6(a) is used as an input.

Referring to FIG. 5, there is shown control means including a control circuit 20 which operates such that, if a control command signal 23A inputed to the control circuit 20 is an angular position function 23 as shown in FIG. 6(a), the control circuit 20 causes the mirror 15 to angularly rotate as shown by a solid line curve in FIG. 6(b), by taking into consideration an angular position signal 21A and an angular velocity signal 22A supplied by the angle detector means 21 and the angular velocity detector means 22 respectively. In FIGS. 6(a) and 6(b), to indicates the time at which the mirror 15 commences its operating stroke from its home position, t1 indicates the time at which the mirror 15 commences its return stroke from it return position toward its home position, and t2 indicates the time at which the mirror 15 returns to its home position.

The angle detector means 21 shown in FIG. 3 includes a film having a plurality of light sections and dark sections of the same width arranged alternately in a predetermined pattern and adapted to be driven by the rotary shaft 12A, for example, and a photoelectric detector for the light and dark sections of the film which is formed at its front with a slit having a photosensitive region of the same width as the light and dark sections of the film. When the rotary shaft 12A rotates, the angle detector means 21 issues the angular position signal 21A which is in the form of continuous triangular waves or substantially triangular waves, the period of which varies depending on the angular velocity of the rotary shaft 12A. When the actual angular position signal is in the form of continuous triangular waves, an angular position signal given as the control command 23A has only to be in the form of continuous triangular waves having a period which varies depending on the angular velocity which the mirror 15 is required to have at any given time.

The control circuit 20 shown in FIG. 5 detects the phase difference between the control command 23A and the angular position signal 21A and issues a signal corresponding to the detected phase difference which is supplied through an amplifier 24 to the linear motor 16 to drive the same. In this embodiment, in order to stabilize the control system, an angular velocity signal 22A issuing from the angular velocity detector means 22 is fed back to the same input terminal of the control circuit 20.

In FIG. 6(b), a broken line curve indicates the path of angular rotation of an angularly rotatable mirror driven by a mechanism for angularly rotating a mirror of the prior art. From the graph of FIG. 6(a), it will be appreciated that the present invention enables the angularly rotatable mirror to angularly rotate continuously along a correct path without showing drift, even if the angle is a minuscule one.

The required function 23 supplied to the control circuit 20 as the control command 23A is shown in FIG. 6(a) in such a manner that the light flux scanning the surface to be scanned or the surface of the original supporting glass plate of a copying machine moves at a constant speed not only in the operating stroke (t0 to t1) in which the mirror 15 angularly rotates from its home position to its return position but also in the return stroke (t1 to t2) in which the mirror 15 returns its return position to its starting position. When the mirror 15 is made to angularly rotate in its return stroke (t1 to t2) as aforesaid by means of the control circuit 20, it is necessary to supply to the amplifier 24 a phase difference signal for the operating stroke (t0 to t1). It is to be understood, however, that the mirror 15 may be made to rotate in its return stroke in a manner different from the manner of rotation in the operating stroke, if it is desired to do so. For example, the mirror 15 can be made to return quickly to its home position or the mirror 15 can be made to rotate at a lower speed when it has reached a position of a predetermined spacing from its home position.

The angularly rotatable mirror apparatus according to the invention has been described as being adapted for use with a slit exposing device of a copying machine. However, it is to be understood that the apparatus can also have application as an illuminating apparatus for an original read-out machine and other similar apparatus requiring scanning a surface by a light flux.

Since the angularly rotatable mirror apparatus according to the invention uses the moving coil type linear motor 16 for angularly rotating the mirror 15, it is possible to make the mirror 15 to angularly rotate through its predetermined range of angles by smoothly changing its angles of rotation and angular velocities in accordance with a required function. Therefore, when this apparatus is used along with the slit exposing device of a copying machine, it is possible to provide an optical system exhibiting an excellent performance which is free from the occurrence of drift in the reflected light because the angular rotation of the mirror does not deviate from its predetermined path. Moreover, the use of the moving coil type linear motor offers the advantages that the operation efficiency of the motor is increased, the construction of the apparatus can be simplified and the reliability of the apparatus can be increased. it is to be understood that the linear motor used in the invention may be of the type in which the permanent magnet is movable, instead of the coil as in the embodiment described by referring to FIG. 4.

In the linear motor 16 in which the movable means 19 is directly connected to the arm 13 extending from the angularly rotatable mirror means 10, the movable means 19 angularly rotates about the rotary shaft 12B connected to the upstanding wall of the bracket 11 supporting the mirror 15. To enable the movable means 19 to move as aforesaid, the gap defined by the center pole 18A and the outer yoke 18B as shown in FIG. 4 should have a suitable size. This entails an increase in the size of the linear motor 16, and necessitates the use of the permanent magnet 17 which has a high magnetomotive force. Also, since the inclination of the coil 19A with respect to the center pole 18A varies depending on the position to which the movable means 19 moves, the direction of operation of a force which is produced by a current passed to the coil 19A and a magnetic flux which interlinks the coil 19A undergoes a change depending of the inclination of the movable means 19. That is a torque produced varies. Thus difficulties are encountered in making the mirror 15 to angularly rotate as desired. This is also the case when the linear motor 16 includes an annular magnet mounted in the inner wall surface of the outer yoke 18B.

Figure 7:
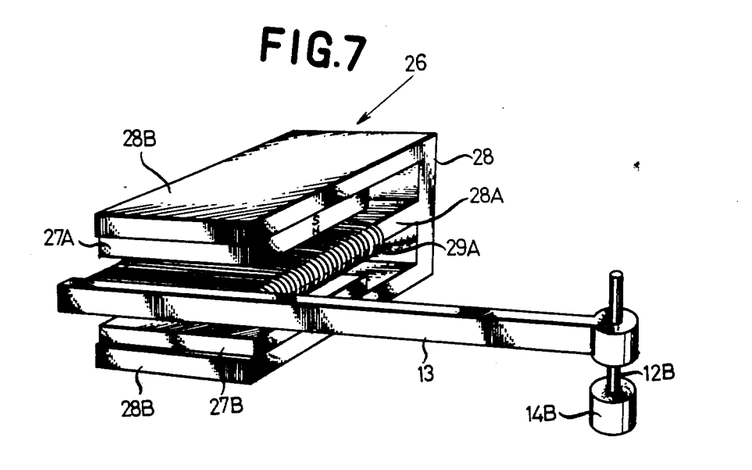
FIG. 7 is a schematic view of another embodiment of the linear motor means.

The gap defined between the coil 19A and the yoke means 18 can be kept constant in size irrespective of the position to which the movable means 19 moves, if a linear motor 26 shown in FIG. 7 is used in which a flat coil 29A is used and a center pole 28 A of an E-shaped yoke means 28 is positioned within the coil 29A, so that two flat surfaces of the flat coil 29A are each located in spaced juxtaposed relation to one of two parallel portions of the outer yoke 28B. The numerals 27A and 27B designate permanent magnets each attached to an inner surface of one of the parallel portions of the outer yoke 28B.

The linear motor 26 shown in FIG. 7 includes the coil 29A having a large transverse dimention along the longitudinal axis of the arm 13, and this makes the length of the arm 13 large. Thus the linear motor 26 has a great load or the movable means of the motor has a large moment of inertia, making it necessary to increase the size of the motor to deal with a given load. The axis of the E-shaped yoke 28 extends linearly with respect to the rotary shafts, so that the linear motor 26 is similar to the linear motor 16 shown in FIG. 3 in that the direction of the force produced undergoes changes.

Figure 8:
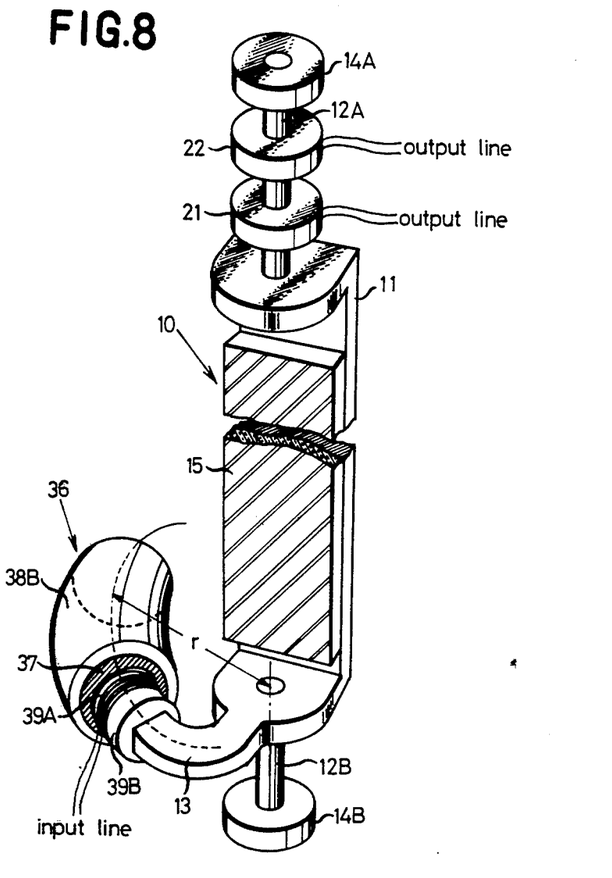
FIGS. 8 and 9 are schematic perspective views of the angularly rotatable mirror apparatus comprising other embodiments of the invention, the embodiment shown in FIG. 8 using arcuate type linear motor means which is circular in cross sectional shape and the embodiment shown in FIG. 9 using arcuate type linear motor means which is rectangular in cross sectional shape.
Figure 9:
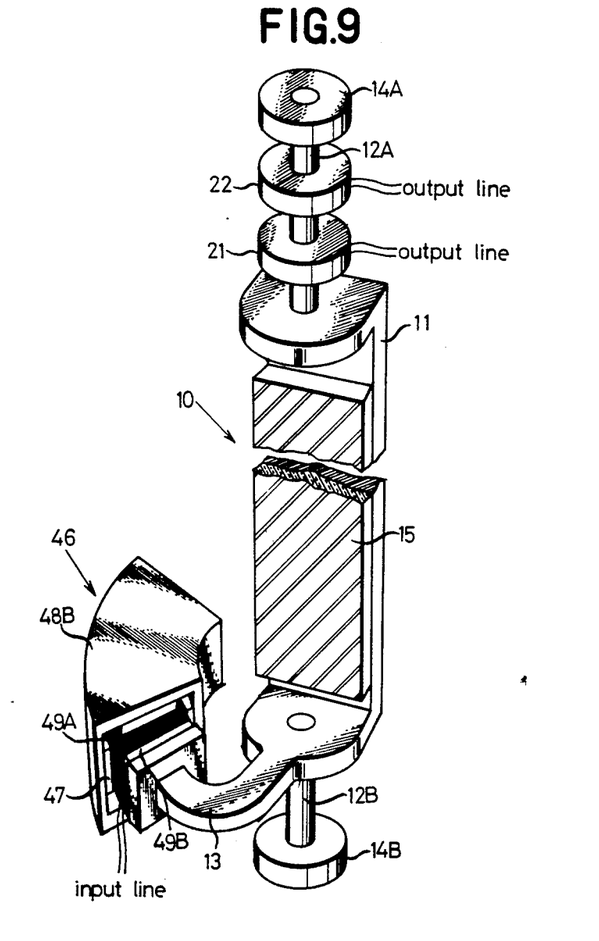

FIGS. 8 and 9 show other embodiments of the angularly rotatable mirror apparatus. In FIGS. 8 and 9, parts similar to those shown in FIG. 3 are designated by like reference characters. The embodiments shown in these figures differ from the embodiment shown in FIG. 3 in that a linear motor used in these embodiment has a longitudinal center line (and of the yoke means and movable means) which is curved along a circular arc of a radius r from the rotary shaft 12B, in a plane which is at right angles to the axis of the rotary shaft 12B. This type of linear motor will be referred to as an arcuate type linear motor in this specification.

The arcuate type linear motor 36 shown in FIG. 8 comprises a yoke means including a center pole of a circular cross sectional shape, not shown, and an outer yoke 38B of a cylindrical shape located concentrically with the center pole. A permanent magnet 37 of an annular shape is attached to an inner wall surface of the cylindrical outer yoke 38B. The linear motor 36 further comprises a movable means consisting of a coil 39A wound on a cylindrical bobbin 39B connected to the arm 13 extending from the angularly rotatable mirror means 10.

The arcuate type linear motor 46 shown in FIG. 9 comprises a yoke means including a center pole of a rectangular cross sectional shape, not shown, and an outer yoke 48B of a box shape similar in cross sectional shape to the center pole and concentric with the center pole The outer yoke 48B which is substantially rectangular in shape has four walls each having a permanent magnet 47 of a plate shape attached thereto. The linear motor 46 further comprises a movable means consisting of a coil 49A wound on a bobbin 49A of a rectangular cross sectional shape.

The use of the linear motors of the arcuate type shown in FIGS. 8 and 9 as means for driving the angularly rotatable mirror means 10 enables the mirror 15 to be angularly rotated in a stable manner, because changes in the position of the angular rotation of the mirror 15 causes little change in the torque exerted on the linear motor 36 or 46. Moreover, the use of the linear motors 36 and 46 shown in these figures makes it possible to obtain an overall compact size in a angularly rotatable mirror apparatus.

In the embodiments shown and described hereinabove, the mirror 15 of the angularly rotatable mirror means 10 has been described with respect to a plane mirror. It is to be understood, however, that the invention is not limited to this type of mirror, and that a curved mirror of the type which partially covers the light source may be used. By angularly rotating the mirror of this type, it is possible to project a light flux in a sweeping movement. For example, a mirror with a surface of a parabolic curve may be used together with a light source arranged at the focus of the mirror. If the mirror of this type is angularly rotated, the same effect as achieved by a plane mirror can be achieved. Thus, even if the angularly rotatable mirror is located in the vicinity of the light source, it is possible to cause a light flux to move at a constant speed on a surface to be scanned by the light flux, as is the case with the angularly rotatable mirror means having a mirror spaced apart from its light source.

What is claimed is:

1. An angularly rotatable mirror apparatus comprising:

a bracket including an elongated mirror support portion;

a rotary shaft extending from opposite ends of said bracket and having a single axis;

a planar mirror attached to said mirror support and having a reflective surface;

arm means extending from the bracket in a plane perpendicular to the rotary shaft;

linear motor means for driving said bracket to pivot the same about said axis, said linear motor means comprising first and second members movable relative to each other along a path substantially tangential to the path of movement of the outer end of said arm means, said first member comprising a center pole extending generally tangentially to the path of movement of the outer end of said arm means, an outer yoke extending generally along the center pole and at least partially enclosing at least a portion of said center pole, said center pole and said outer yoke defining an elongated gap therebetween, said second member comprising a cylindrical coil located in said gap and reciprocably movable substantially in the direction in which said center pole extends; and means for rigidly connecting one of said first and second members of said linear motor means to said arm means.

2. An angularly rotatable mirror apparatus as claimed in claim 1, wherein said axis is in the plane of said reflective surface of said planar mirror.

3. An angularly rotatable mirror apparatus for scanning, with a ribbon-like light flux, from the underside of a transparent support plate of a copying machine, an original placed on said support plate, said apparatus comprising:

A. angularly rotatable mirror means located in a position in the vicinity of one end of said support plate and spaced apart from said support plate a certain distance and comprising:

a. a bracket including an elongated rectangular planar portion, and a plurality of upstanding walls located at opposite ends of the longitudinal axis of said rectangular planar member;

b. a plurality of rotary shafts having a common axis and each rigidly secured to one of said upstanding walls, said rotary shafts each being rotatably supported by a bearing so that the axis of rotation of each said rotary shaft will become substantially parallel to said support plate; and c. a plane mirror supported on the upper surface of said rectangular planar portion, said plane mirror including a reflecting surface which is in alignment with the axis of rotation of each said rotary shaft;

B. arm means extending from said bracket a certain distance in a direction perpendicular to the axis of rotation of said angularly rotatable mirror means;

C. linear motors means for driving said angularly rotatable mirror means and comprising:

a. a permanent magnet having two poles;

b. a yoke means including a center pole which is circular in cross section connected to one of the poles of said permanent magnet and curves along a circular arc, and an outer yoke circular in cross section connected to the other pole of said permanent magnet and surrounding said center pole coaxially therewith;

c. a gap defined between said center pole and said outer yoke; and d. a movable means including a generally cylindrical coil located in said gap and movable in reciprocatory movement in a direction in which said center pole extends, said movable means being fixedly connected directly to said arm means, said center pole, said outer yoke and said movable means being positioned such that they curve along a circular arc centered on the axis of rotation of said angularly rotatable mirror means and having a radius equal to the length of said arm means;

said permanent magnet, said yoke means and said gap forming a magnetic circuit;

D. means for producing a signal indicating the actual instantaneous angular position of said angularly rotatable mirror means when said rotary shafts of said angularly rotatable mirror means are angularly displaced;

E. means for producing a signal indicating the known required angular position of said rotary shafts of said angularly rotatable mirror means which should be assumed thereby during the angularly rotational movement so that the light flux reflected by said plane mirror and striking the original on said support plate after passing through said support plate will move at a constant speed on the surface of the original; and F. control circuit means controlling the value of a current flowing to said cylindrical coil of said linear motor means based on the differences between the known angular positions which said angularly rotatable mirror means should assume at each instant and the actual angular position of said angularly rotatable mirror means.

4. An angularly rotatable mirror apparatus for scanning, with a ribbon-like light flux, from the underside of a transparent support plate of a copying machine, an original placed on said support plate, said apparatus comprising:

A. angularly rotatable mirror means located in a position in the vicinity of one end of said support plate and spaced aparat from said support plate a certain distance and comprising:
  a. a bracket including an elongated rectangular planar portion, and a plurality of upstanding walls located at opposite ends of the longitudinal axis of said rectangular planar member;
  b. a plurality of rotary shafts having a common axix and each rigidly secured to one of said upstanding walls, said rotary shafts each being rotatably supported by a bearing so that the axis of rotation of each said rotary shaft will become substantially parallel to said support plate; and
  c. a plane mirror supported on the upper surface of said rectangular planar portion, said plane mirror including a reflecting surface which is in alignment with the center axis of rotation of each said rotary shaft;
B. arm means extending from said bracket a certain distance in a direction perpendicular to the axis of rotation of said angularly rotatable mirror means;
C. linear motor means for driving said angularly rotatable mirror means and comprising:
  a. a yoke means including a center pole which is circular in cross section and curves along a circular arc, and an outer yoke circular in cross section connected to one end of said center pole and surrounding said center pole coaxially therewith;
  b. at least one permanent magnet, said permanent magnet being mounted on an inner wall surface of said outer yoke with a gap being defined between said permanent magnet and said center pole, so that said permanent magnet, said yoke means and said gap form a magnetic circuit; and
  c. a movable means including a generally cylindrical coil located in said gap and movable in reciprocatory movement in a direction in which said center pole extends, said movable means being fixedly connected directly to said arm means, said center pole, said outer yoke and said movable means being positioned such that they curve along a circular arc centered on the axis of rotation of said angularly rotatable mirror means and having a radius equal to the length of said arm means;
D. means for producing a signal indicating the actual instantaneous angular position of said angularly rotatable mirror means when said rotary shafts of said angularly rotatable mirror means are angularly displaced;
E. means for producing a signal indicating the known required angular position of said rotary shafts of said angularly rotatable mirror means which should be assumed thereby during the angularly rotational movement so that the light flux reflected by said plane mirror and striking the original on said support plate after passing through said support plate will move at a constant speed on the surface of the original; and
F. control circuit means controlling the value of a current flowing to said cylindrical coil of said linear motor means based on the differences between the known angular position which said angularly rotatable mirror means should assume at each instant and the actual angular position of said angularly rotatable mirror means.

5. An angularly rotatable mirror apparatus for scanning, with a ribbon-like light flux, from the underside of a transparent support plate of a copying machine, an original placed on said support plate, said apparatus comprising:
A. angularly rotatable mirror means located in a position in the vicinity of one end of said support plate and spaced apart from said support plate a certain distance and comprising:
  a. a bracket including an elongated rectangular planar portion, and a plurality of upstanding walls located at opposite ends of the longitudinal axis of said rectangular planar member;
  b. a plurality of rotary shafts having a common axia and each rigidly secured to one of said upstanding walls, said rotary shafts each being rotatably supported by a bearing so that the axis of rotation of each said rotary shaft will become substantially parallel to said support plate; and
  c. a plane mirror supported on the upper surface of said rectangular planar portion, said plane mirror including a reflecting surface which is in alignment with the center axis of rotation of each said rotary shaft;
B. arm means extending from said bracket a certain distance in a direction perpendicular to the axis of rotation of said angularly rotatable mirror means;
C. linear motor means for driving said angularly rotatable mirror means and comprising:
  a. a permanent magnet having two poles;
  b. a yoke means including a center pole which is rectangular in cross section connected to one of the poles of said permanent magnet and curves along a circular arc, and an outer yoke rectangular in cross section connected to the other pole of said permanent magnet and surrounding said center pole coaxially therewith;
  c. a gap defined between said center pole and said outer yoke; and
  d. a movable means including a rectangular coil located in said gap and movable in reciprocatory movement in a direction in which said center pole extends, said movable means being fixedly connected directly to said arm means, said center pole, said outer yoke and said movable means being positioned such that they curve along a circular arc centered on the axis of rotation of said angularly rotatable mirror means and having a radius equal to the length of said arm means;
said permanent magnets, said yoke means and said gap forming a magnetic circuit; and
D. means for producing a signal indicating the actual instantaneous position of said angularly rotatable mirror means when said rotary shafts of said angularly rotatable mirror means are angularly displaced;
E. means for producing a signal indicating the known required angular position of said rotary shafts of said angularly rotatable mirror means which should be assumed thereby during the angular rotational movement so that the light flux reflected by said plane mirror and striking the original on said support plate after passing through said support plate will move at a constant speed on the surface of the original; and
F. control circuit means controlling the value of a current flowing to said rectangular coil of said linear motor means based on the difference between the known angular position which said angularly rotatable mirror means should assume at each instant and the actual angular position of said angularly rotatable mirror means.

6. An angularly rotatable mirror apparatus for scanning, with a ribbon-like light flux, from the underside of a transparent support plate of a copying machine, an original placed on said support plate, comprising:

A. angularly rotatable mirror means located in a position in the vicinity of one end of said support plate and spaced apart from said support plate a certain distance and comprising:
  a. a bracket including an elongated rectangular planar portion, and a plurality of upstanding walls located at opposite ends of the longitudinal axis of said rectangular planar member;
  b. a plurality of rotary shafts having a common axis and each rigidly secured to one of said upstanding walls, said rotary shafts each being rotatably supported by a bearing so that the axis of rotation of each said rotary shaft will become substantially parallel to said support plate; and
  c. a plane mirror supported on the upper surface of said rectangular planar portion, said plane mirror including a reflecting surface which is in alignment with the center axis of rotation of each said rotary shaft;
B. arm means extending from said bracket a certain distance in a direction perpendicular to the axis of rotation of said angularly rotatable mirror means;
C. linear motor means for driving said angularly rotatable mirror means and comprising:
  a. a yoke means including a center pole which is rectangular in cross section and curves along a circular arc, and an outer yoke rectangular in cross section connected to one end of said center pole and surrounding said center pole coaxially therewith;
  b. a plurality of permanent magnets, said permanent magnets being mounted on at least two juxtaposed surfaces of inner wall surfaces with a gap being defined between said permanent magnets and said center pole, so that said permanent magnets, said yoke means and said gap form a magnetic circuit; and
  c. a movable means including a rectangular coil located in said gap and movable in reciprocatory movement in a direction in which said center pole extends, said movable means being fixedly connected directly to said arm means, said center pole, said outer yoke and said movable means being positioned such that they curve along a circular arc centered on the axis of rotation of said angularly rotatable mirror means and having a radius equal to the length of said arm means;
D. means for producing a signal indicating the actual instanteous angular position of said angularly rotatable mirror means when said rotary shafts of said angularly rotatable mirror means are angularly displaced;
E. means for producing a signal indicating the known required angular position of said rotary shafts of said angularly rotatable mirror means which should be assumed thereby during the angular rotational movement so that the light flux reflected by said plane mirror and striking the original on said original placing plate after passing through said support plate will move at a constant speed on the surface of the original; and
F. control circuit means controlling the value of a current flowing to said rectangular coil of said linear motor means based on the difference between the known angular position which said angularly rotatable mirror means should assume at each instant and the actual angular position of said angularly rotatable mirror means.

* * * * *